(12) United States Patent
Filipenko et al.

(10) Patent No.: US 10,749,394 B2
(45) Date of Patent: Aug. 18, 2020

(54) ELECTRICAL CONDUCTOR FOR AN ELECTRICAL MACHINE WITH AN ELEVATED POWER-TO-WEIGHT RATIO

(71) Applicant: SIEMENS AKTIENGESELLSCHAFT, München (DE)

(72) Inventors: Mykhaylo Filipenko, Erlangen (DE); Paul Beasley, Abingdon (GB)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 34 days.

(21) Appl. No.: 16/077,145

(22) PCT Filed: Jan. 24, 2017

(86) PCT No.: PCT/EP2017/051427
§ 371 (c)(1),
(2) Date: Aug. 10, 2018

(87) PCT Pub. No.: WO2017/137250
PCT Pub. Date: Aug. 17, 2017

(65) Prior Publication Data
US 2019/0027988 A1    Jan. 24, 2019

(30) Foreign Application Priority Data

Feb. 11, 2016 (DE) .......... 10 2016 202 071

(51) Int. Cl.
*H02K 3/02* (2006.01)
*H01B 1/02* (2006.01)
(Continued)

(52) U.S. Cl.
CPC ............ *H02K 3/02* (2013.01); *C01B 32/186* (2017.08); *H01B 1/026* (2013.01); *H01B 1/04* (2013.01); *H02K 3/18* (2013.01)

(58) Field of Classification Search
CPC ........ C01B 32/186; H01B 1/026; H01B 1/04; H02K 3/02; H02K 3/18
(Continued)

(56) References Cited

U.S. PATENT DOCUMENTS 6,087,583 A * 7/2000 Runge ................. H01F 27/2823
174/15.1
6,140,733 A * 10/2000 Wedde ................... H02K 3/345
310/196
(Continued)

FOREIGN PATENT DOCUMENTS

CN         1341263 A      3/2002
CN      204390797 U      6/2015
(Continued)

OTHER PUBLICATIONS

German Office Action for German Application No. 102016202071.4, dated Jan. 19, 2017.
(Continued)

*Primary Examiner* — Tulsidas C Patel
*Assistant Examiner* — Rashad H Johnson
(74) *Attorney, Agent, or Firm* — Lempia Summerfield Katz LLC

(57) ABSTRACT

The invention relates to an electrical conductor which is made up substantially of one or even several metal conductors which are sheathed by a graphene layer. Particularly in the case of the electrical conductor transporting an alternating current, the current in the conductor is forced radially outwards and therefore flows in the graphene layer. Since graphene has a substantially better conductivity than the materials customary in this application, such as copper for example, relatively low losses are accordingly produced and substantially higher degrees of efficiency can be achieved. The electrical conductor constructed in this way is used in a
(Continued)

stator and/or rotor winding of an electrical machine, so that it has a significantly elevated power-to-weight ratio.

10 Claims, 2 Drawing Sheets

(51) Int. Cl.
*H02K 3/18* (2006.01)
*C01B 32/186* (2017.01)
*H01B 1/04* (2006.01)

(58) Field of Classification Search
USPC .......................................... 310/179, 180, 181
See application file for complete search history.

(56) References Cited

U.S. PATENT DOCUMENTS

| | | | |
|---|---|---|---|
| 6,750,399 B1 | 6/2004 | Daeumling | |
| 2008/0197744 A1* | 8/2008 | Herbold | H01R 39/14 310/232 |
| 2008/0293575 A1* | 11/2008 | Hirose | H01B 12/16 505/230 |
| 2010/0101828 A1* | 4/2010 | Duarte Pena | H01F 1/143 174/120 C |
| 2012/0153762 A1 | 6/2012 | Tassinario et al. | |
| 2015/0345745 A1 | 12/2015 | Asadi | |
| 2016/0336103 A1 | 11/2016 | Giezendanner-Thoben et al. | |

FOREIGN PATENT DOCUMENTS

| | | |
|---|---|---|
| CN | 104854717 A | 8/2015 |
| CN | 204946585 U | 1/2016 |
| DE | 102013226572 A1 | 6/2015 |
| WO | WO2013012507 A1 | 1/2013 |
| WO | WO2014087318 A1 | 6/2014 |
| WO | WO2014116258 A1 | 7/2014 |
| WO | WO2015139736 A1 | 9/2015 |

OTHER PUBLICATIONS

PCT International Search Report and Written Opinion of International Searching Authority dated Apr. 10, 2018 corresponding to PCT International Application No. PCT/EP2017/051427 filed Jan. 24, 2017.
Chinese Office Action for Chinese Application No. 2017800108323 dated Aug. 2, 2019.
European Office Action for European Patent Application No. 17 702 798.4-1201 dated Oct. 1, 2019.

* cited by examiner

US 10,749,394 B2

ELECTRICAL CONDUCTOR FOR AN ELECTRICAL MACHINE WITH AN ELEVATED POWER-TO-WEIGHT RATIO

CROSS REFERENCE TO RELATED APPLICATIONS

The present patent document is a § 371 nationalization of PCT Application Serial Number PCT/EP2017/051427, filed Jan. 24, 2017, designating the United States which is hereby incorporated by reference in its entirety. This patent document also claims the benefit of DE 102016202071.4 filed Feb. 11, 2016 which is also incorporated by reference in its entirety.

FIELD

Embodiments relate to an electrical conductor and to the use thereof, for example for conducting electric current in the case of use of an electrical machine, for example for a generator or for an electric motor.

BACKGROUND

To classify an electrical machine, use may be made inter alia of what is referred to as the power-to-weight ratio that expresses the power able to be supplied by the machine in relation to a weight and is generally given in kW/kg. Although power-to-weight ratios of orders of magnitude of up to 1 kW/kg are sufficient for many technical applications, electrical machines including power-to-weight rations of at least 20 kW/kg are required for electrification in aviation, for example.

To increase the power-to-weight ratio of electrical machines, the current coverage in the stator of the machine or the current density in the stator windings may be increased, for example. The increase results in less conductor material that is required in the turns at the same power, as a result of which the weight of the machine is reduced with the power staying the same.

To increase the current density from normal values, such as for example 2-10 A/mm$^2$, to orders of magnitude of 25-100 A/mm$^2$, a first approach may involve cooling the copper windings that form the stator turns during operation. The copper windings may be brought into direct contact with a coolant, or the coppers windings may be configured to be internally hollow and the coolant is pumped directly through the cavity that is formed. In both cases, a comparatively large contact surface is obtained between conductor and coolant, and therefore an increased cooling effect, such that a comparatively large amount of heat is able to be evacuated. This is reflected in the fact that the electrical lines are able to transport higher currents. A second approach for increasing the current density involves using cryogenically cooled, possibly even superconductive electrical conductors with electrical resistance that decreases significantly with the ambient temperature. The losses in the conductor are consequently reduced, resulting in comparatively high current densities.

In both approaches, that are based on cooling the respective electrical conductor, there is the disadvantage that an increased effort is required in order to cool the conductor. Furthermore, in the case of the internally cooled hollow conductor, electrical losses are comparatively high, and the efficiency is consequently low.

SUMMARY AND DESCRIPTION

The scope of the present disclosure is defined solely by the appended claims and is not affected to any degree by the statements within this summary. The present embodiments may obviate one or more of the drawbacks or limitations in the related art.

Embodiments provide for increasing the power-to-weight ratio of an electrical machine.

An electrical conductor is used to conduct an electric current in a current flow direction. The electrical conductor is in this case formed by a multiplicity of metal conductors that are in each case at least partly surrounded, for example, sheathed, by a graphene layer.

An electrical conductor is provided with a conventional metal conductor that is surrounded or sheathed by a graphene layer. AC current losses (AC losses) of such an electrical conductor are reduced by factors of an order of magnitude of 100 in comparison with conventional conductors. The reduction results from the current flowing via the electrical conductor is pressed into the graphene layer on account of the radially outwardly acting current displacement. Since graphene includes a substantially better conductivity than the materials commonly used in similar applications, such as for example copper, correspondingly lower losses are obtained, and significantly higher efficiencies are able to be achieved. Due to the better conductivity as well that the metal conductor includes a multiplicity of separate metal individual conductors, a further reduction in the effect of the current displacement is achieved.

Consequently, the use of such an electrical conductor instead of the typically used electrical conductors, that for example include a copper wire surrounded by an insulator, for a component of an electrical machine, provides a significantly higher power-to-weight ratio for the electrical machine including the electrical component.

Additionally, less cumbersome cooling may be provided on account of the thermal conductivity of graphene, that is better in comparison with conventional materials.

In an embodiment, the electrical conductor may be produced as a stranded conductor including a multiplicity of individual wires. Each of the individual wires of the stranded conductor forms one of the metal conductors that are surrounded by graphene. The individual wires are in each case at least partly surrounded or sheathed by a graphene layer. The combination of stranded conductor and graphene sheath of the individual wires results in an improved conductivity of the electrical conductor, for example, for AC current.

In an embodiment, the electrical conductor may be produced as a stack of layers including a multiplicity of individual layers and forming a foil conductor. The individual layers are stacked above one another in a direction perpendicular to the current flow direction and the multiplicity of individual layers includes at least one metal layer that forms the metal conductor, and not just the at least one but at least two graphene layers. The individual layers are arranged above one another in a manner such that the metal layer lies between the two graphene layers and the graphene layers thus at least partly surround the metal conductor. An advantage of such a foil conductor is that of easier and cheaper production, as graphene is able to be produced on a large scale. Coating a graphene film with copper, that forms the metal conductor, may be performed for example by way of what is referred to as a CVD method. Very thin copper layers may be produced leading to a significant reduction in proximity losses.

The multiplicity of individual layers may include a plurality of metal layers and a plurality of graphene layers, the electrical conductor formed not just by one but by a plurality of metal conductors. Each metal layer forms one of the metal conductors. The metal layers and the graphene layers are arranged alternately above one another, such that in each case one metal layer lies between two graphene layers and the graphene layers at least partly surround the respective metal conductor. A further improvement in the conductivity is obtained in that the electrical conductor includes not just one but a multiplicity of metal individual conductors.

In an embodiment for a foil conductor, in each case two graphene layers of the stack of layers and the metal layer lying between these two graphene layers may form an electrical conductor element. The multiplicity of individual layers additionally includes heat-dissipating layers, for example ceramic layers, that are arranged in the stack of layers in a manner such that a respective electrical conductor element in each case lies between two of the heat-dissipating layers. The heat-dissipating layers that may be configured for example as ceramic layers, provide improved evacuation of heat that may have been produced and provide improved stability of the electrical conductor.

At least the uppermost and the lowermost layer of the stack of layers may be heat-dissipating layers.

An electrical component for the electrical machine includes an electrical conductor that is flowed through by electric current in a current flow direction at least in the operating state of the electrical machine. The electrical conductor is formed by at least one metal conductor that is at least partly surrounded, for example, sheathed, by a graphene layer. Due to the improved conductivity of such a special electrical conductor, the use of this electrical conductor in or for an electrical machine provides a significant increase in the power-to-weight ratio.

The electrical component may be a stator for the electrical machine, the electrical conductor, for example, may be used to produce a stator winding arranged at the stator.

The electrical component may be a rotor for the electrical machine. The electrical conductor may be used to produce a winding arranged at the rotor.

The electrical conductor may be an electrical conductor including a multiplicity of metal individual conductors.

DETAILED DESCRIPTION

Figure 1:
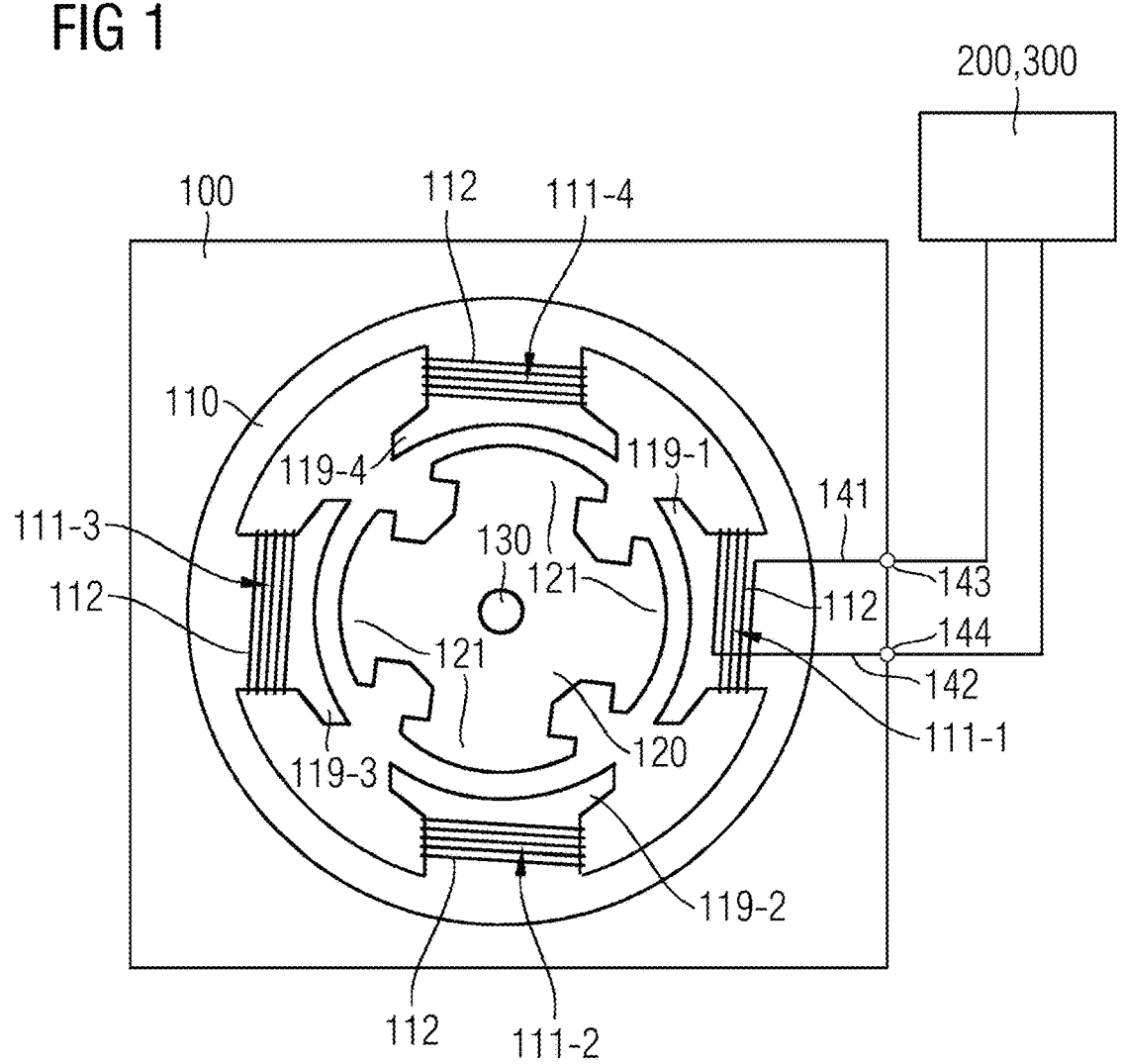
FIG. 1 depicts an electrical machine according to an embodiment.

FIG. 1 depicts an electrical machine 100 configured as a generator. The electrical machine 100 may also be operated as an electric motor in a similar structure. Depending on the configuration of the electrical machine as a generator or as an electric motor and/or as for example a radial or axial flow machine including a rotor configured as an internal rotor or else as an external rotor, etc., the various components of the machine may be arranged differently. Each embodiments include electrical conductors are required to transport current. The electrical conductors and the use thereof in an electrical machine constitute the actual focal point of the embodiments.

The generator 100 includes a stator 110 and a rotor 120 configured as an internal rotor. The rotor 120 is arranged inside the stator 110 and rotates about an axis of rotation in the operating state of the electrical machine 100. The rotor 120 may be driven or set in rotation with the aid of a motor, not depicted, by way of a shaft 130. Pole shoes 121 of the rotor 120 constitute magnetic poles, and the stator 110 includes a plurality of stator windings 111-1, . . . , 111-4 that are in each case arranged at or wound around pole shoes 119-1, . . . , 119-4 of the stator 110. Each of the windings 111-1, . . . , 111-4 is formed by an electrical conductor 112 that is flowed through by an electric current in the operating state of the electrical machine 100. The pole shoes 121 of the rotor 120 may be formed for example as permanent magnets or as excited windings.

When the rotor 120 rotates, a voltage is induced in the stator windings 111-1, . . . , 111-4 of the stator 110. The voltage is fed to electrical terminals 143, 144 of the generator 100 by way of electrical lines 141, 142. The induced voltage may be tapped off at the terminals 143, 144 and finally made available to an electrical consumer 200.

To operate the electrical machine 100 as an electric motor, a voltage source 300 is connected to the terminals 143, 144 instead of the electrical consumer 200. The configuration is depicted in FIG. 1. The voltage source 300 provides an AC voltage, for example, that includes the effect that the stator windings 111-1, . . . , 111-4 generate corresponding magnetic fields that interact with the magnetic fields of the permanent magnets 121 of the rotor 120. The result is that the rotor 120, and with it the shaft 130, are set in rotation when the components are arranged appropriately with respect to one another. The shaft 130 is connected to an object 500 to be driven, for example to a propeller, that is set in rotation by the rotation of the rotor 120 and of the shaft 130.

Figure 2:
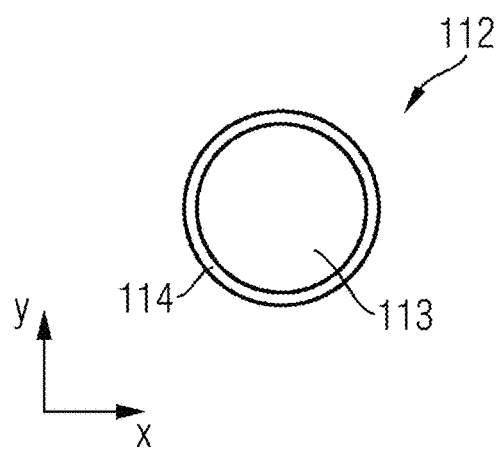
FIG. 2 depicts a cross section of an electrical conductor according to an embodiment.

FIG. 2 depicts an embodiment of the electrical conductor 112 in a cross-sectional view. In FIG. 2, an electric current may thus flow into and out of the plane of the paper. An electrical conductor 112, from which the respective stator windings 111-1, . . . , 111-4 are formed, includes a metal conductor 113, for example of a copper conductor, that is at least partly surrounded or sheathed by a graphene layer 114. The stipulation 'at least partly surrounded' is intended to express the fact that the copper conductor, for example at the start and end thereof, is not necessarily covered by the graphene layer 114, such that the conductor 113 is able to be connected electrically to other components, for example to the electrical conductors 141, 142 or directly to the electrical terminals 143, 144. By way of example, the graphene layer 114 may extend as far as possible completely along the longitudinal extent of the metal conductor 113, with the ends of the metal conductor 113 however left uncovered to an extent such that ends are able to be connected electrically to the further components.

In an embodiment, the electrical conductor 112 is similar to a conventional electrical conductor, that includes a metal conductor, for example a copper conductor, including a substantially round cross section and an insulating sheath. In contrast thereto, the metal conductor 113, used here, of the electrical conductor 112 is surrounded or sheathed by the graphene layer 114. A sheath is distinguished in that the sheath extends completely around the sheathed conductor in a circumferential direction and also at least as far as possible completely along the longitudinal extent in the current flow direction. A current flowing via the copper conductor 113 is pressed into the graphene sheath 114 on account of the radially outwardly acting current displacement. Since graphene includes a substantially better conductivity than the materials commonly used, such as for example copper, correspondingly lower losses are obtained, and significantly higher efficiencies are able to be achieved.

Figure 3:
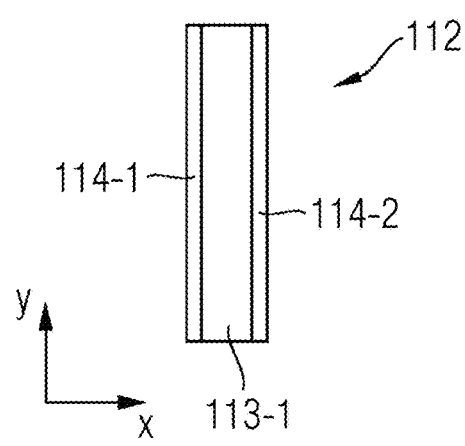
FIG. 3 depicts a cross section of the electrical conductor according to an embodiment.

FIG. 3 depicts a cross-sectional view of an embodiment of the electrical conductor 112. An electric current flows into and out of the plane of the paper. In the embodiment, the electrical conductor 112 is configured as a foil conductor. The electrical conductor 112 is a stack of layers including a multiplicity of individual layers, the individual layers being stacked above one another in a direction x perpendicular to the current flow direction z of the electric current in the electrical conductor 112. For that section of the electrical conductor 112 depicted in FIG. 3, the current flow direction corresponds to the z-direction. In an embodiment, the multiplicity of individual layers includes a metal layer 113-1, that forms the metal conductor 113, and two graphene layers 114-1, 114-2. The individual layers 113-1, 114-1, 114-2 are arranged alternately above one another, such that the metal layer 113-1 lies between the two graphene layers 114-1, 114-2 and the graphene layers 114-1, 114-2 at least partly surround the metal conductor 113-1. In an embodiment, the metal conductor 113-1 is not sheathed by the graphene layer, but rather a graphene layer 114-1, 114-2 is in each case arranged on an upper side and on a lower side of the metal conductor 113-1.

The foil conductor may for example be defined in that the extents of individual layers in the respective cross section, that is to say in both directions x, y perpendicular to the current flow direction z through the individual layer, differ significantly from one another, for example by one order of magnitude or more. Although the extent of each individual layer in the current flow direction z is substantially greater in any case than the extents in the cross-sectional directions x, y, one of the extents in the cross-sectional directions x, y, for example the extent in the y-direction, is also substantially greater than the extent in the respective other cross-sectional direction, e.g. the x-direction.

Terms such as 'above', 'below', 'above one another' etc. relate in this connection, and in connection with an embodiment, to that direction in space in which the individual layers of the stack of layers have the smallest extent. In a first approximation, the individual layers extend substantially in two directions in space, e.g. in the current flow direction, for example the z-direction, and in a direction perpendicular thereto, for example in the y-direction, while the layers have a comparatively small extent in the third direction in space, e.g. in the x-direction in this case, e.g. the layers are virtually two-dimensional. The terms 'above', 'below', 'above one another' etc. thus make reference to the x-direction.

An advantage of such a foil conductor is that of easier and cheaper production, since graphene is already able to be manufactured on a large scale, so that for example a copper layer or foil is able to be coated with a graphene layer. As an alternative, it is also conceivable to coat a graphene film with copper, that then forms the metal conductor. The coating may be performed for example by way of what is called a CVD ('chemical vapor deposition') method. It would then be possible, for example, to produce very thin copper layers better than in the case of a normal conductor leading to a significant reduction in proximity losses.

Figure 4:
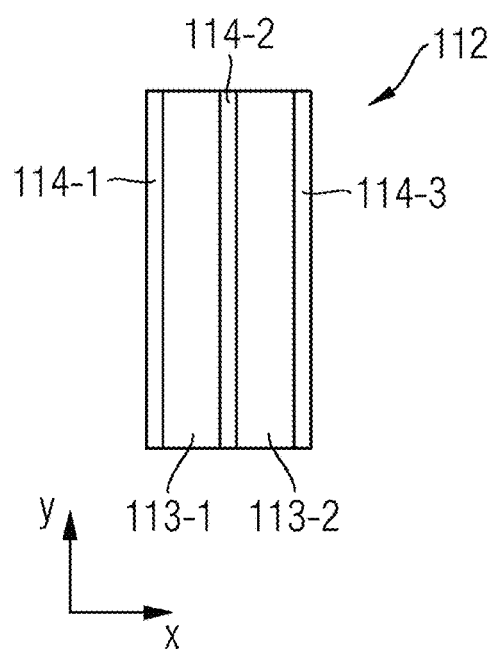
FIG. 4 depicts a cross section of the electrical conductor according to an embodiment.

In an embodiment of the electrical conductor 112 depicted in FIG. 4, the stack of layers includes not just one but a plurality of metal layers. Each of the metal layers 113-1, 113-2 forms a metal conductor of the electrical conductor 112. In addition to the metal layers 113-1, 113-2, the stack of layers has a multiplicity of graphene layers 114-1, 114-2, 114-3. The metal layers 113-1, 113-2, 113-3 and the graphene layers 114-1, 114-2, 114-3 are again arranged alternately above one another, such that in each case a metal layer lies between two graphene layers and these graphene layers 114-1, 114-2, 114-3 thus at least partly surround the respective metal conductor 113-1, 113-2, namely are arranged above and below the respective metal conductor 113-1, 113-2.

The embodiment depicted in FIG. 4, of the electrical conductor 112 includes only A=2 metal layers 113-1, 113-2. An embodiment may also be produced with more than two metal layers (A>2) and a correspondingly higher number B of graphene layers 114-1, . . . , 114-B, where B=A+1 may but not necessarily may hold true in the embodiment.

Figure 5:
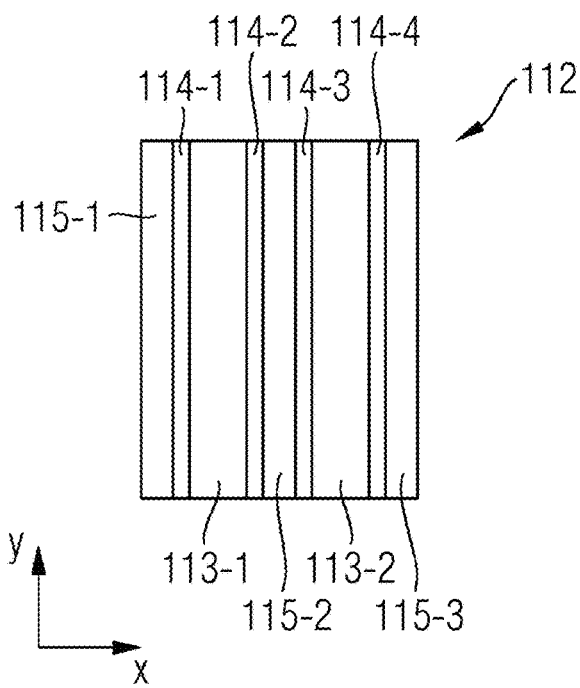
FIG. 5 depicts a cross section of the electrical conductor according to an embodiment.

In an embodiment that is depicted in FIG. 5 and that corresponds to a development of an embodiment, in each case two graphene layers 114-1, . . . of the stack of layers and the metal layer 113-1, . . . lying between these two graphene layers 114-1, . . . form an electrical conductor element of the electrical conductor 112. In addition to the individual layers introduced in connection with the second variant, heat-dissipating layers 115-1, . . . are provided. The heat-dissipating layers 115-1, . . . are arranged in the stack of layers in a manner such that a respective electrical conductor element lies in each case between two of the heat-dissipating layers 115-1, . . . . In this case, the various individual layers are arranged such that the outermost individual layers in the stack of layers, that is the uppermost and lowermost individual layer of the stack of layers in the case of layers arranged above one another, are heat-dissipating layers. The heat-dissipating layers may be configured ceramic layers and allow improved evacuation of heat that may have been produced and provide improved stability of the electrical conductor 112.

In the embodiment of FIG. 5, the stack of layers A=2 includes metal layers 113-1, 113-2 and B=4 graphene layers 114-1, . . . , 114-B and correspondingly C=3 heat-dissipating layers 115-1, . . . , 115-C.

Figure 6:
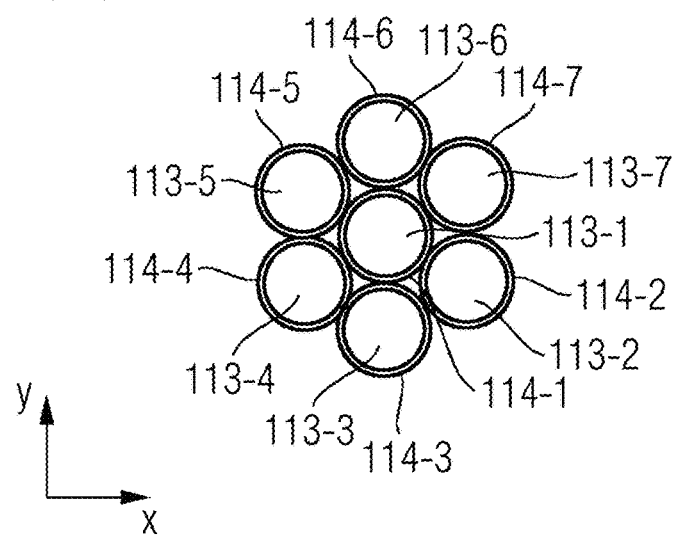
FIG. 6 depicts a cross section of the electrical conductor according to an embodiment.

In an embodiment of the electrical conductor 112, the latter is configured as a stranded conductor that includes a multiplicity of metal individual wires 113-1, . . . , 113-7. An embodiment is depicted in FIG. 6. In the embodiment, at least one of the individual wires or each individual one of the individual wires, is in each case surrounded or sheathed by a graphene layer 114-1, . . . , 114-7.

The electrical lines 141, 142 that extend between the respective stator winding 111 and the terminals 143, 144 of the electrical machine 100 may also be constructed analogously, e.g. the electrical lines 141, 142 include of one or more metal conductors 113, for example of copper conductors, that are at least partly surrounded by a graphene layer 114.

A method suitable for producing the graphene layers is for example the technique referred to as 'microwave plasma chemical vapor deposition' for coating copper with graphene. As an alternative, a technique referred to as 'chemical vapor deposition' is known, by way of which graphene is able to be applied to copper.

The graphene layer 114 in the various embodiments and variants may be surrounded by an insulating lacquer, that is not depicted, to prevent breakdowns between adjacent conductors in the event of high voltages. As the conductivity of graphene is direction-dependent in a manner such that a current is conducted only within the virtually two-dimensional graphene layer but not perpendicular thereto, such an insulating lacquer layer may in certain circumstances be dispensed with. The degree of filling of the winding may be increased in comparison with conventional approaches including a dedicated insulating layer.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An electrical conductor for conducting an electric current in a current flow direction, the electrical conductor comprising:
    a stack of layers comprising a multiplicity of individual layers, wherein the multiplicity of individual layers are stacked above one another in a direction perpendicular to a current flow direction,
    wherein the multiplicity of individual layers comprises at least one metal layer that forms a metal conductor of a plurality of metal conductors, and at least two graphene layers,
    wherein the multiplicity of individual layers are arranged above one another such that each metal layer of the at least one metal layers lies between the at least two graphene layers,
    wherein, in each case, two graphene layers of the stack of layers and the metal layer lying between the two graphene layers forms an electrical conductor element, and
    wherein the multiplicity of individual layers further comprises heat-dissipating layers arranged in the stack of layers such that a respective electrical conductor element in each case lies between two of the heat-dissipating layers.

2. The electrical conductor of claim 1, wherein the electrical conductor is a stranded conductor comprising a plurality of individual wires, wherein each of the plurality of individual wires forms one of the plurality of metal conductors.

3. The electrical conductor of claim 1, wherein the multiplicity of individual layers comprises a plurality of metal layers and a plurality of graphene layers and the electrical conductor is formed by a plurality of metal conductors, wherein each metal layer forms one of the metal conductors of the plurality of metal conductors, the metal layers and the graphene layers are arranged alternately above one another, such that in each case each metal layer of the metal layers lies between the at least two graphene layers.

4. The electrical conductor of claim 1, wherein an uppermost and a lowermost layer of the stack of layers are heat-dissipating layers.

5. An electrical component for an electrical machine, the electrical component comprising:
    an electrical conductor that is flowed through by electric current in a current flow direction at least in an operating state of the electrical machine, wherein the electrical conductor is formed by a stack of layers comprising a multiplicity of individual layers, wherein the multiplicity of individual layers are stacked above one another in a direction perpendicular to a current flow direction,
    wherein the multiplicity of individual layers comprises at least one metal layer that forms a metal conductor of a plurality of metal conductors, and at least two graphene layers,
    wherein the multiplicity of individual layers are arranged above one another such that each metal layer of the at least one metal layers lies between the at least two graphene layers,
    wherein, in each case, two graphene layers of the stack of layers and the metal layer lying between two graphene layers forms an electrical conductor element, and
    wherein the multiplicity of individual layers further comprises heat-dissipating layers arranged in the stack of layers such that a respective electrical conductor element in each case lies between two of the heat-dissipating layers.

6. The electrical component of claim 5, wherein the electrical component is a stator for the electrical machine, wherein the electrical conductor is a stator winding arranged at the stator.

7. The electrical component of claim 5, wherein the electrical component is a rotor for the electrical machine, wherein the electrical conductor is a winding arranged at the rotor.

8. The electrical component of claim 5, wherein the electrical conductor is a stranded conductor comprising a plurality of individual wires, wherein each of the plurality of individual wires forms one of the plurality of metal conductors.

9. The electrical component of claim 5, wherein the plurality of individual layers comprises a plurality of metal layers and a plurality of graphene layers and the electrical conductor is formed by a plurality of metal conductors, wherein each metal layer forms one of the metal conductors of the plurality of metal conductors, the metal layers and the graphene layers are arranged alternately above one another, such that in each case each metal layer of the metal layers lies between the at least two graphene layers.

10. The electrical component of claim 5, wherein an uppermost and a lowermost layer of the stack of layers are heat-dissipating layers.

* * * * *